United States Patent
Kalyanasundharam et al.

(10) Patent No.: US 10,540,316 B2
(45) Date of Patent: Jan. 21, 2020

(54) CANCEL AND REPLAY PROTOCOL SCHEME TO IMPROVE ORDERED BANDWIDTH

(71) Applicant: Advanced Micro Devices, Inc., Sunnyvale, CA (US)

(72) Inventors: Vydhyanathan Kalyanasundharam, San Jose, CA (US); Eric Christopher Morton, Austin, TX (US); Chen-Ping Yang, Fremont, CA (US); Amit P. Apte, Austin, TX (US); Elizabeth M. Cooper, Los Gatos, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 100 days.

(21) Appl. No.: 15/856,799

(22) Filed: Dec. 28, 2017

(65) Prior Publication Data
US 2019/0205280 A1 Jul. 4, 2019

(51) Int. Cl.
*G06F 13/00* (2006.01)
*G06F 13/42* (2006.01)
(Continued)

(52) U.S. Cl.
CPC ...... *G06F 13/4282* (2013.01); *G06F 12/0806* (2013.01); *G06F 12/0808* (2013.01);
(Continued)

(58) Field of Classification Search
None
See application file for complete search history.

(56) References Cited

U.S. PATENT DOCUMENTS 7,181,561 B2  2/2007 Barth et al.
7,295,563 B2  11/2007 Hughes
(Continued)

FOREIGN PATENT DOCUMENTS

EP  0817074  1/1998
EP  2891984  7/2015

OTHER PUBLICATIONS

International Search Report and Written Opinion in International Application No. PCT/US2018/051912, dated Jan. 4, 2019, 11 pages.

*Primary Examiner* — Henry Tsai
*Assistant Examiner* — Dean Phan
(74) *Attorney, Agent, or Firm* — Meyertons Hood Kivlin Kowert and Goetzel PC; Rory D. Rankin

(57) ABSTRACT

Systems, apparatuses, and methods for implementing a cancel and replay mechanism for ordered requests are disclosed. A system includes at least an ordering master, a memory controller, a coherent slave coupled to the memory controller, and an interconnect fabric coupled to the ordering master and the coherent slave. The ordering master generates a write request which is forwarded to the coherent slave on the path to memory. The coherent slave sends invalidating probes to all processing nodes and then sends an indication that the write request is globally visible to the ordering master when all cached copies of the data targeted by the write request have been invalidated. In response to receiving the globally visible indication, the ordering master starts a timer. If the timer expires before all older requests have become globally visible, then the write request is cancelled and replayed to ensure forward progress in the fabric and avoid a potential deadlock scenario.

23 Claims, 7 Drawing Sheets

(51) Int. Cl.
  *G06F 12/0806* (2016.01)
  *G06F 12/0808* (2016.01)
  *G06F 13/364* (2006.01)
  *G06F 12/0811* (2016.01)

(52) U.S. Cl.
  CPC ........ *G06F 13/364* (2013.01); *G06F 12/0811* (2013.01); *G06F 2212/283* (2013.01); *G06F 2212/621* (2013.01); *G06F 2213/0026* (2013.01)

(56) References Cited

U.S. PATENT DOCUMENTS

| | | |
|---|---|---|
| 9,720,708 B2 | 8/2017 | Caspole |
| 2007/0022253 A1 | 1/2007 | Cypher et al. |
| 2009/0031035 A1* | 1/2009 | Dharmaraju .......... H04W 8/005 709/230 |
| 2009/0248988 A1* | 10/2009 | Berg ................... G06F 12/0835 711/141 |
| 2011/0320743 A1 | 12/2011 | Hagspiel et al. |

* cited by examiner

CANCEL AND REPLAY PROTOCOL SCHEME TO IMPROVE ORDERED BANDWIDTH

BACKGROUND

Description of the Related Art

Peripheral Component Interconnect Express (PCIe) is a high-speed serial computer expansion bus standard which provides a high-bandwidth interconnect protocol for reliable data transport. Various types of data, such as memory, input/output (I/O), and configuration data, can pass through a PCIe interface. PCIe bandwidth continues to increase with new generations of the PCIe standard. For example, the extended speed mode (ESM) of PCIe 4.0 can transfer data at speeds up to 25 gigabits per second (Gbps). Additionally, increasing numbers of memory channels are needed to sustain higher data rates. PCIe, and other standards such as CPU store instruction operations, commonly require writes to be "ordered" such that younger writes cannot be observed by other processors or I/O agents until all older writes have been observed by the processor or I/O agent. To achieve this ordering, typically, switching between memory channels requires waiting for requests to become globally ordered to avoid deadlocks. Waiting for requests to be globally ordered leads to significant degradation of peak ordered bandwidth.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing a cancel and replay mechanism for ordered bandwidth are disclosed herein. In one embodiment, a system includes at least a plurality of processing nodes (e.g., central processing units (CPUs)), an ordering master, an interconnect fabric, a coherent slave, a probe filter, a memory controller, and a memory. Each processing node includes one or more processing units. The type of processing unit(s) ((e.g., general purpose processor, graphics processing unit (GPU), application specific integrated circuit (ASIC), field programmable gate array (FPGA), digital signal processor (DSP)) included in each processing node can vary from embodiment to embodiment and from node to node. The ordering master is tied to a CPU or I/O device (like a PCIe root complex) that requires writes to be ordered and is responsible for ensuring this ordering within the distributed fabric. The coherent slave is coupled to the ordering master via the interconnect fabric, and the coherent slave is also coupled to the probe filter and the memory controller.

In one embodiment, the ordering master generates a write request which is forwarded to the coherent slave on the path to memory. The coherent slave sends out invalidating probes to processing nodes caching copies of the targeted data and then sends an indication that the write request is globally visible to the ordering master when all cached copies of the data targeted by the write request have been invalidated. In response to receiving the globally visible indication, the ordering master starts a timer. If the timer expires before all older requests have become globally visible, then the write request is cancelled and replayed. In some embodiments, any younger requests which have an address dependency with the write request will also be cancelled and replayed. As used herein, a write request is described as being "globally visible" when all cached copies of the targeted data have been invalidated.

Figure 1:
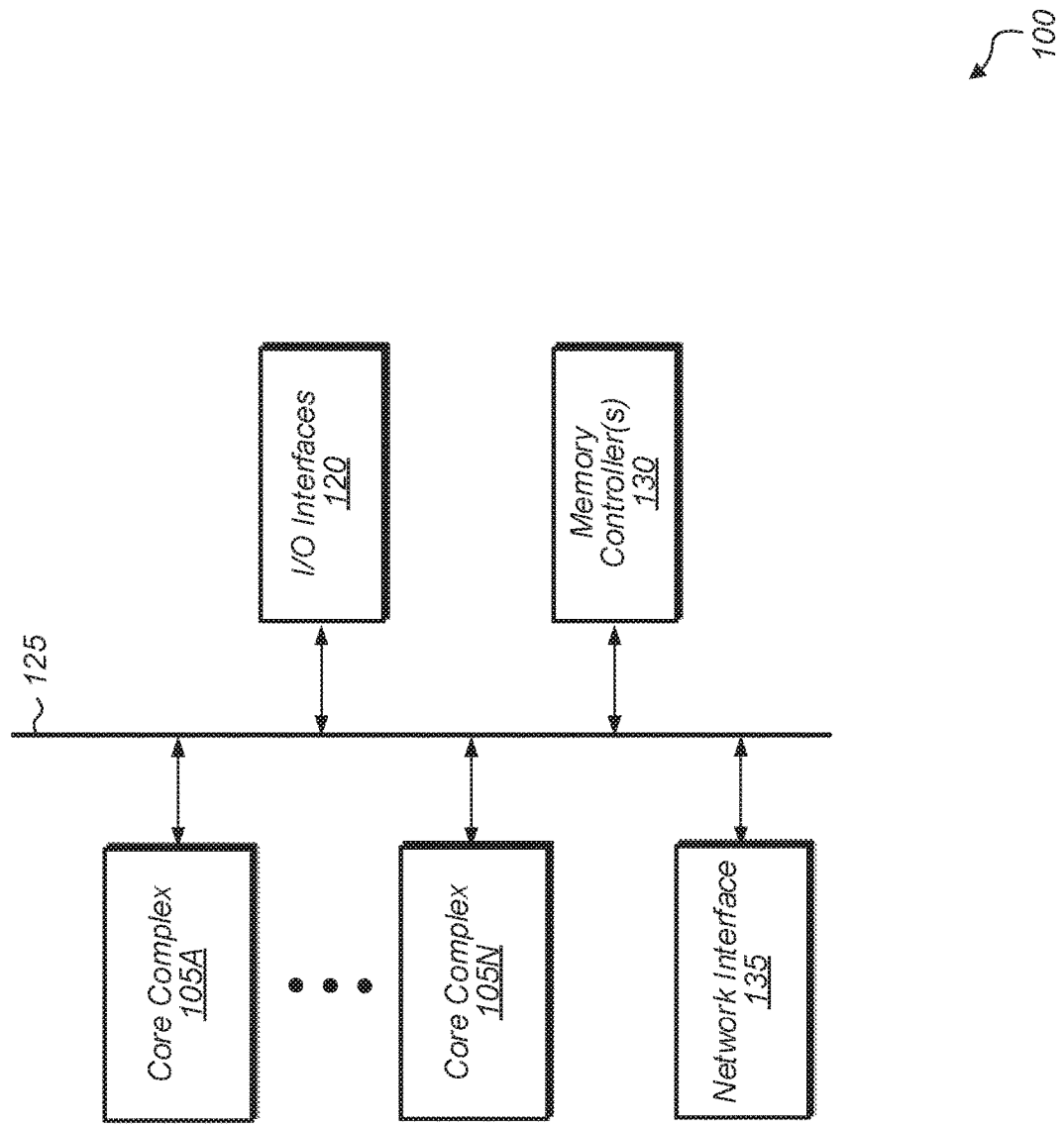
FIG. 1 is a block diagram of one embodiment of a computing system.

Referring now to FIG. 1, a block diagram of one embodiment of a computing system 100 is shown. In one embodiment, computing system 100 includes at least core complexes 105A-N, input/output (I/O) interfaces 120, bus 125, memory controller(s) 130, and network interface 135. In other embodiments, computing system 100 can include other components and/or computing system 100 can be arranged differently. In one embodiment, each core complex 105A-N includes one or more general purpose processors, such as central processing units (CPUs). It is noted that a "core complex" can also be referred to as a "processing node" or a "CPU" herein. In some embodiments, one or more core complexes 105A-N can include a data parallel processor with a highly parallel architecture. Examples of data parallel processors include graphics processing units (GPUs), digital signal processors (DSPs), and so forth. Each processor core within core complex 105A-N includes a cache subsystem with one or more levels of caches. In one embodiment, each core complex 105A-N includes a cache (e.g., level three (L3) cache) which is shared between multiple processor cores.

Memory controller(s) 130 are representative of any number and type of memory controllers accessible by core complexes 105A-N. Memory controller(s) 130 are coupled to any number and type of memory devices (not shown). For example, the type of memory in memory device(s) coupled to memory controller(s) 130 can include Dynamic Random Access Memory (DRAM), Static Random Access Memory (SRAM), NAND Flash memory, NOR flash memory, Ferroelectric Random Access Memory (FeRAM), or others. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various embodiments, computing system 100 can be a server, computer, laptop, mobile device, game console, streaming device, wearable device, or any of various other types of computing systems or devices. It is noted that the number of components of computing system 100 can vary from embodiment to embodiment. There can be more or fewer of each component than the number shown in FIG. 1. It is also noted that computing system 100 can include other components not shown in FIG. 1. Additionally, in other embodiments, computing system 100 can be structured in other ways than shown in FIG. 1.

Figure 2:
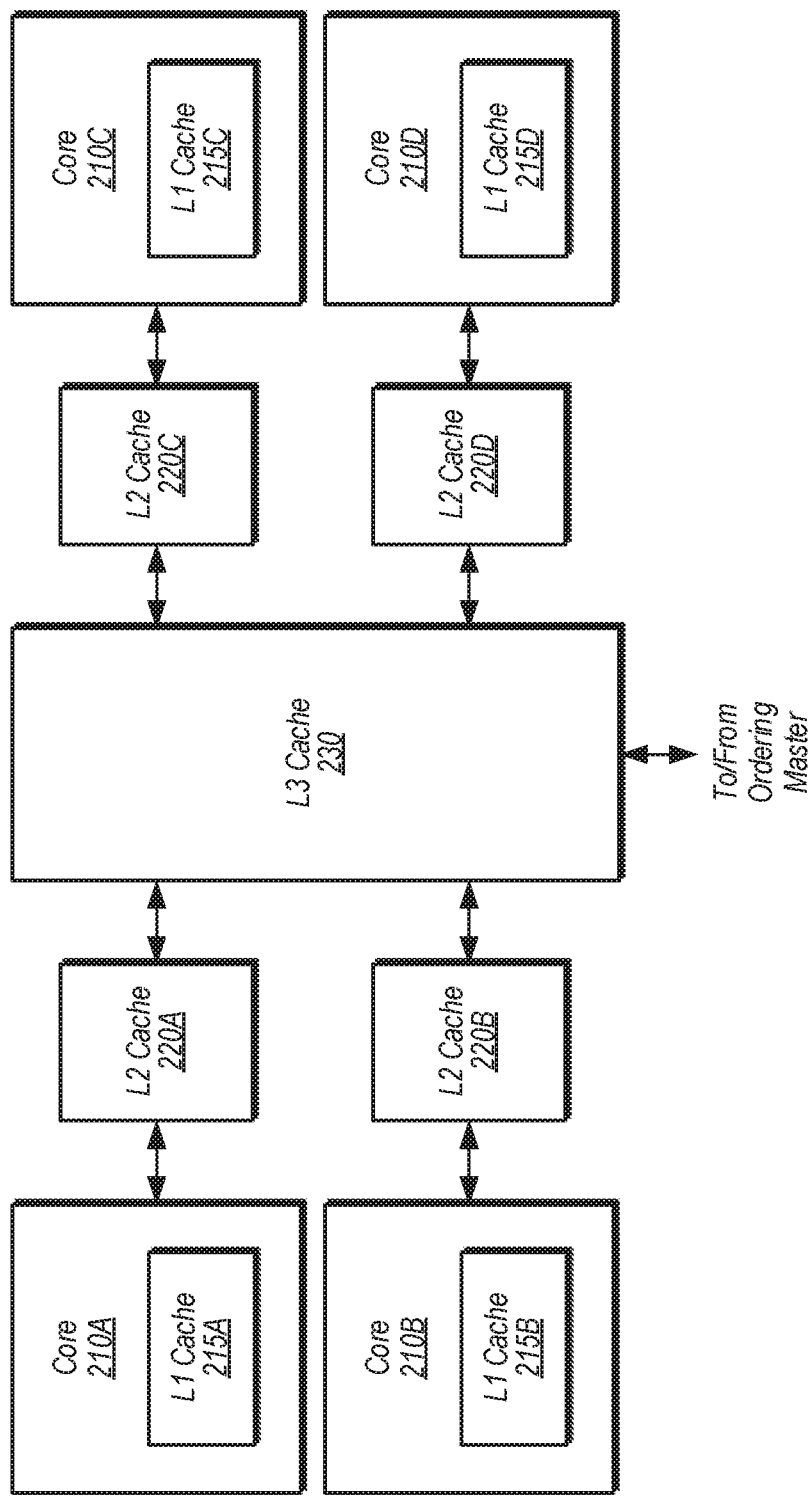
FIG. 2 is a block diagram of one embodiment of a core complex.

Turning now to FIG. 2, a block diagram of one embodiment of a core complex 200 is shown. In one embodiment, core complex 200 includes four processor cores 210A-D. In other embodiments, core complex 200 can include other numbers of processor cores. It is noted that a "core complex" can also be referred to as a "processing node" or "CPU" herein. In one embodiment, the components of core complex 200 are included within core complexes 105A-N (of FIG. 1).

Each processor core 210A-D includes a cache subsystem for storing data and instructions retrieved from the memory subsystem (not shown). For example, in one embodiment, each core 210A-D includes a corresponding level one (L1) cache 215A-D. Each processor core 210A-D can include or be coupled to a corresponding level two (L2) cache 220A-D. Additionally, in one embodiment, core complex 200 includes a level three (L3) cache 230 which is shared by the processor cores 210A-D. L3 cache 230 is coupled to an ordering master for access to the fabric and memory subsystem. It is noted that in other embodiments, core complex 200 can include other types of cache subsystems with other numbers of cache and/or with other configurations of the different cache levels.

Figure 3:
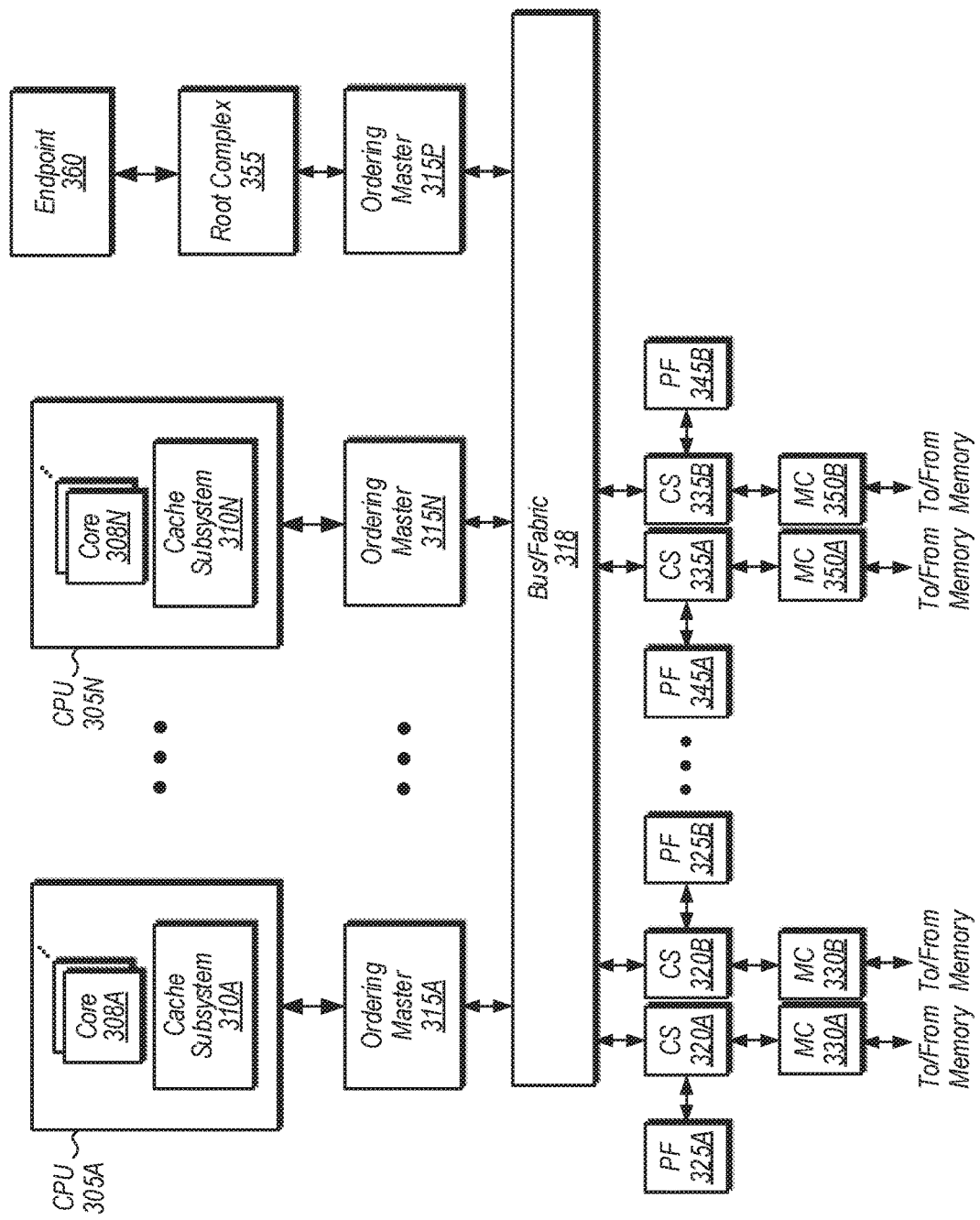
FIG. 3 is a block diagram of one embodiment of a multi-CPU system.

Referring now to FIG. 3, a block diagram of one embodiment of a multi-CPU system 300 is shown. In one embodiment, system includes multiple CPUs 305A-N. The number of CPUs per system can vary from embodiment to embodiment. Each CPU 305A-N can include any number of cores 308A-N, respectively, with the number of cores varying according to the embodiment. Each CPU 305A-N also includes a corresponding cache subsystem 310A-N. Each cache subsystem 310A-N can include any number of levels of caches and any type of cache hierarchy structure.

In one embodiment, each CPU 305A-N is connected to a corresponding ordering master 315A-N. As used herein, an "ordering master" is defined as an agent that processes traffic flowing over an interconnect (e.g., bus/fabric 318). In various embodiments, an ordering master can be a CPU coherent master, an input/output (I/O) master, or a master for any client that wants fully-ordered write memory requests. In one embodiment, an ordering master is a coherent agent which manages coherency for a connected CPU. To manage coherency, an ordering master receives and processes coherency-related messages and probes and generates coherency-related requests and probes. It is noted that an "ordering master" can also be referred to as an "ordering master unit" herein.

In one embodiment, each CPU 305A-N is coupled to a pair of coherent slaves via a corresponding ordering master 315A-N and bus/fabric 318. For example, CPU 305A is coupled through ordering master 315A and bus/fabric 318 to coherent slaves 320A-B. As used herein, a "master" is defined as a component that generates requests, and a "slave" is defined as a component that services requests. Coherent slave (CS) 320A is coupled to memory controller (MC) 330A and coherent slave 320B is coupled to memory controller 330B. Coherent slave 320A is coupled to probe filter (PF) 325A, with probe filter 325A including entries for memory regions that have cache lines cached in system 300 for the memory accessible through memory controller 330A. It is noted that probe filter 325A, and each of the other probe filters, can also be referred to as a "cache directory". Similarly, coherent slave 320B is coupled to probe filter 325B, with probe filter 325B including entries for memory regions that have cache lines cached in system 300 for the memory accessible through memory controller 330B. It is noted that the example of having two memory controllers per CPU is merely indicative of one embodiment. It should be understood that in other embodiments, each CPU 305A-N can be connected to other numbers of memory controllers besides two.

Bus/fabric 318 is also coupled to ordering master 315P which is coupled to endpoint 360 via root complex 355. Ordering master 315P is representative of any number of ordering masters which provide connections from input/output (I/O) endpoints to bus/fabric 318. Root complex 355 is the root of an I/O hierarchy and couples CPUs 305A-N and memory (via bus/fabric 318 and ordering master 315P) to I/O systems such as endpoint 360. Endpoint 360 represents any number and type (e.g., I/O device, network interface controller, disk controller) of peripherals that are coupled, directly or via a switch (not shown), to root complex 355. In one embodiment, endpoint 360 is coupled to root complex 355 via a PCIe interconnect link. Any number of other endpoints can also be coupled to root complex 355, and some embodiments may instantiate multiple root complexes 355 to independent ordering masters 315P attached to the bus/fabric 318. Additionally, it is noted that in other embodiments there can be other connections from bus/fabric 318 to other components not shown to avoid obscuring the figure. For example, in another embodiment, bus/fabric 318 includes connections to any number of other I/O interfaces and I/O devices.

In a similar configuration to that of CPU 305A, CPU 305N is coupled to coherent slaves 335A-B via ordering master 315N and bus/fabric 318. Coherent slave 335A is coupled to memory via memory controller 350A, and coherent slave 335A is also coupled to probe filter 345A to manage the coherency of cache lines corresponding to memory accessible through memory controller 350A. Coherent slave 335B is coupled to probe filter 345B and coherent slave 335B is coupled to memory via memory controller 365B. As used herein, a "coherent slave" is defined as an agent that manages coherency by processing received requests and probes that target a corresponding memory controller. It is noted that a "coherent slave" can also be referred to as a "coherent slave unit" herein. Additionally, as used herein, a "probe" is defined as a message passed from a coherency point to one or more caches in the computer system to determine if the caches have a copy of a block of data and optionally to indicate the state into which the cache should place the block of data.

In one embodiment, a given ordering master 315 is configured to receive read and write memory requests from a corresponding CPU 305 or endpoint 360. A "write memory request" can also be referred to as a "write request" or a "write" herein. Similarly, a "read memory request" can also be referred to as a "read request" or a "read" herein. When the given ordering master 315 receives a write request from the corresponding CPU 305 or endpoint 360, the given ordering master 315 is configured to convey the write request, without the corresponding data, to the coherent slave of the targeted memory controller and memory device. The given ordering master 315 buffers the write data while sending the write request as a write command without data to the targeted coherent slave.

When the given ordering master 315 receives an indication from the coherent slave that the write request is globally visible, the given ordering master 315 starts a timer for the write request. In one embodiment, the indication of being globally visible is a target done message. If all of the older outstanding requests queued at the given ordering master 315 are already globally visible before the timer expires, then the given ordering master 315 sends an indication to the coherent slave that the write request is ready to commit. In one embodiment, the indication that the write request is ready to commit is a source done (or SrcDone) message.

If at least one older request is still not globally visible when the timer expires, the given ordering master 315 cancels the write request. Then, the given ordering master 315 replays the write request by resending the write request to the coherent slave. By canceling and replaying the write request when the timer expires, if an older request is still not globally visible, this helps to prevent deadlocks in system 300. Also, the cancel and replay mechanism allows ordering masters 315A-N to issue read and write requests on fabric 318 without waiting for prior requests to become globally ordered.

Figure 4:
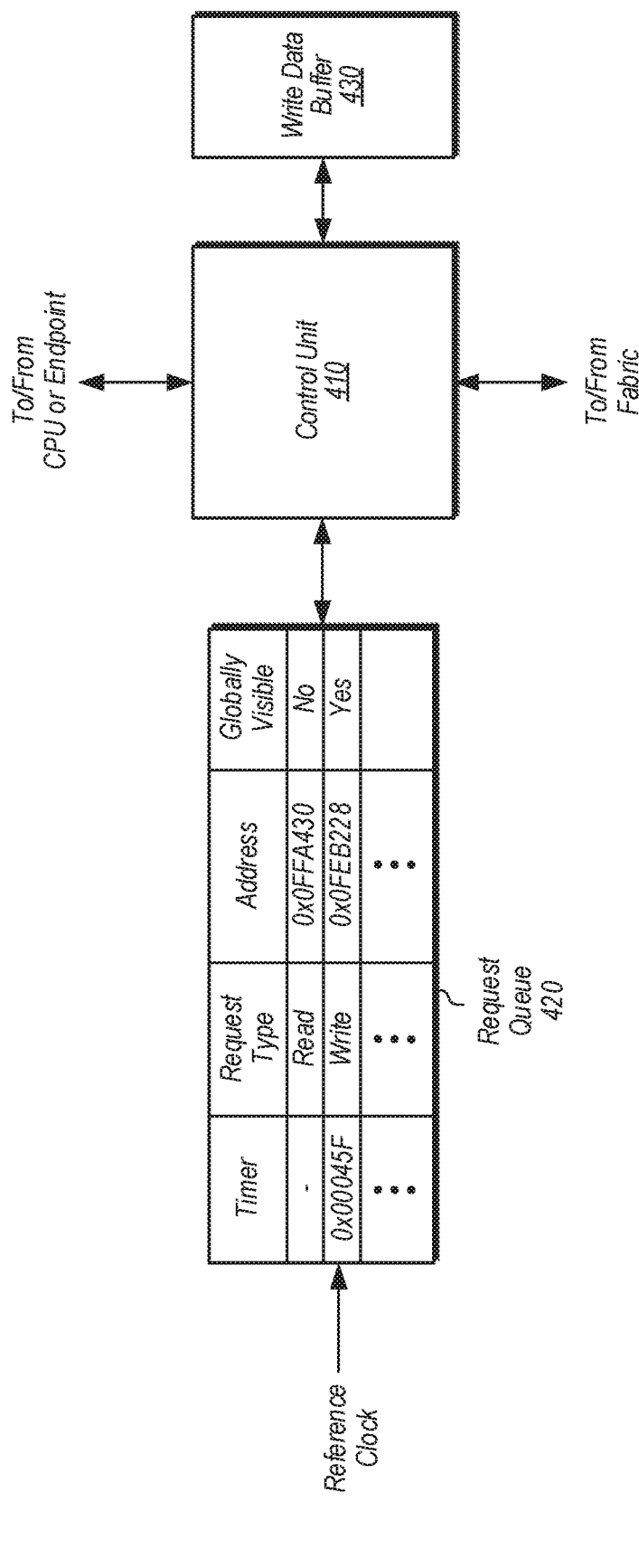
FIG. 4 is a block diagram of one embodiment of a master.

Turning now to FIG. 4, a block diagram of one embodiment of an ordering master 400 is shown. In one embodiment, the ordering masters 315A-N (of FIG. 3) include the logic of ordering master 400. Ordering master 400 includes at least control unit 410, request queue 420, and write data buffer 430. Control unit 410 is coupled to request queue 420, write data buffer 430, a local CPU (not shown) or one or more endpoint(s) for receiving memory requests, and an interconnect fabric (not shown) for conveying memory requests to any number of coherent slaves. Control unit 410 can be implemented using any suitable combination of software, hardware, and/or firmware.

In one embodiment, when control unit 410 receives a memory request from the local CPU or endpoint, control unit 410 creates an entry in request queue 420 for the request. In one embodiment, each entry of request queue 420 includes a timer field, a request type field, address field, globally visible field, and optionally one or more other fields. Control unit 410 is configured to forward a received request to the corresponding coherent slave. For write requests, control unit 410 is configured to send a write command without the data to the coherent slave. When control unit 410 receives an indication from the coherent slave that the write request is globally visible, then control unit 410 starts the timer associated with the entry in request queue 420. In one embodiment, a reference clock is utilized to decrement the timer in the given entry. The clock frequency of the reference clock can vary according to the embodiment.

In one embodiment, request queue 420 stores requests in the order in which they were received. In other words, the requests in request queue 420 are stored in order from oldest to youngest, with the entries wrapping around to the start of request queue 420 when the last entry is occupied. In this embodiment, a first pointer can point to the youngest entry and a second pointer can point to the oldest entry. In another embodiment, the entries of request queue 420 can include an age field to indicate a relative age in comparison to the other entries. In other embodiments, other techniques for tracking the relative ages of outstanding requests are possible and are contemplated.

If the timer for a given write request entry expires, and there is at least one older request that is not globally visible, then control unit 410 is configured to cancel the write request. In one embodiment, control unit 410 cancels the write request by sending a source done (or SrcDone) message to the coherent slave with a cancel bit set. In other embodiments, control unit 410 can utilize other types of messages or signals to cancel the write request. Additionally, control unit 410 checks to see if any younger requests have an address dependency (i.e., target the same address) with the cancelled write request. In some embodiments, if any younger requests have an address dependency with the write request being cancelled, then the control unit 410 also cancels these younger requests. After canceling the write request (and, optionally, any younger dependent requests), control unit 410 replays the write request (and, optionally, any younger depending requests) by resending the write request (and, optionally, any younger depending requests) to the coherent slave.

Figure 5:
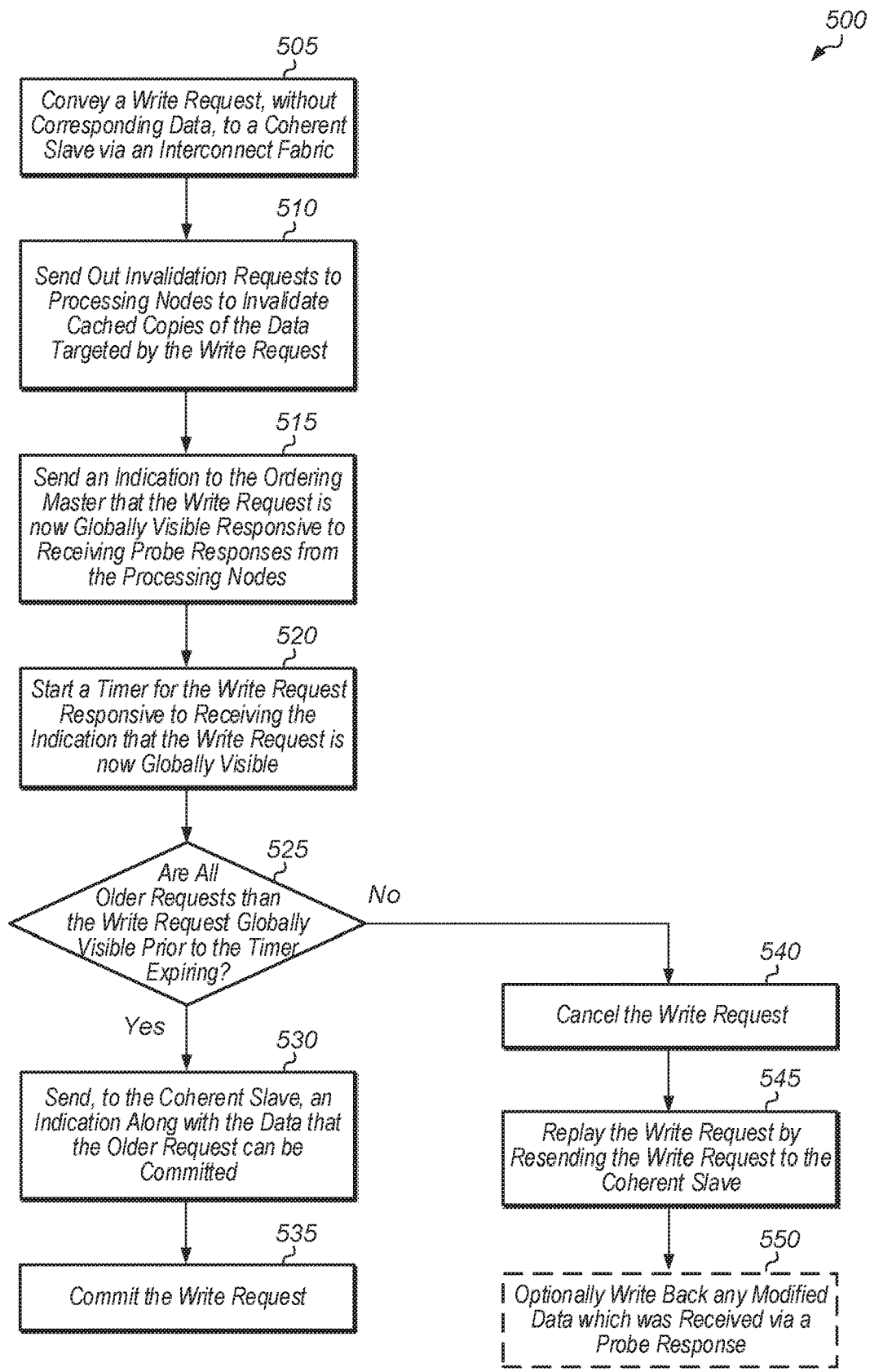
FIG. 5 is a generalized flow diagram illustrating one embodiment of a method for implementing a cancel and replay mechanism.
Figure 6:
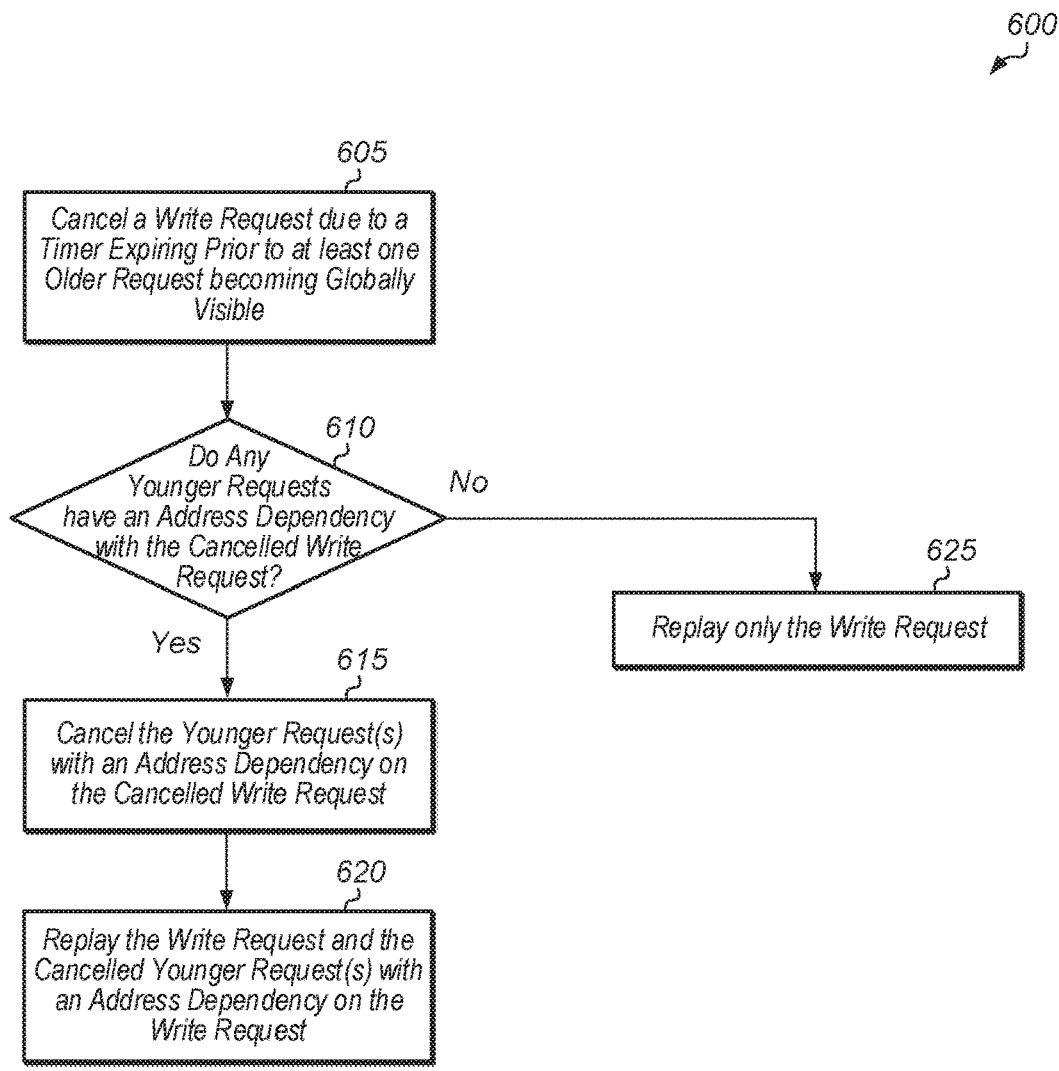
FIG. 6 is a generalized flow diagram illustrating another embodiment of a method for implementing a cancel and replay mechanism.

Referring now to FIG. 5, one embodiment of a method 500 for implementing a cancel and replay mechanism is shown. For purposes of discussion, the steps in this embodiment and those of FIG. 6 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

An ordering master conveys a write request, without corresponding data, to a coherent slave via an interconnect fabric (block 505). Responsive to receiving the request, the coherent slave sends out invalidation requests to processing nodes to invalidate any cached copies of the data targeted by the write request (block 510). As noted above, in various embodiments the probe filter includes entries indicating which nodes or devices are caching copies of data. Responsive to receiving probe responses from the processing nodes (e.g., either confirming invalidation of the cache line and/or returning any modified data), the coherent slave sends an indication to the ordering master that the write request is now globally visible (block 515). In one embodiment, the indication that the write request is now globally visible is a target done (or TgtDone) message.

In response to receiving the indication from the coherent slave that the write request is now globally visible, the ordering master starts a timer for the write request (block 520). The duration of the timer can vary according to the embodiment. In some embodiments, the duration of the timer is programmable. If all older requests than the write request are globally visible prior to the timer expiring (conditional block 525, "yes" leg), then the ordering master sends, to the coherent slave, an indication along with the data that the write request can be committed (block 530). In one embodiment, this indication is a source done (or SrcDone) message that also includes the data of the write request. The coherent slave then commits the write request (block 535). As used herein, to "commit" the write request is defined as writing the data of the write request to the targeted location in memory. In one embodiment, the coherent slave merges the data of the write request with any modified data that was received via a probe response from one or more processing nodes. After block 535, method 500 ends.

If any older request than the write request is not globally visible prior to the timer expiring (conditional block 525, "no" leg), then the ordering master cancels the write request (block 540). In one embodiment, the ordering master cancels the write request by sending a source done (or SrcDone) message with a cancel bit set. Next, the ordering master replays the write request by resending the write request to the coherent slave (block 545). Also, the coherent slave optionally writes back any modified data that was received via a probe response (block 550). After block 550, method 500 ends.

Turning now to FIG. 6, another embodiment of a method 600 for implementing a cancel and replay mechanism is shown. A write request is canceled due to a timer expiring prior to at least one older request becoming globally visible (block 605). In response to the write request getting cancelled, an ordering master checks to see if any younger requests have an address dependency with the cancelled write request (conditional block 610). If any younger requests have an address dependency with the write request being cancelled (conditional block 610, "yes" leg), then the ordering master also cancels the younger request(s) with an address dependency on the cancelled write request (block 615). Next, the ordering master replays the write request and the cancelled younger request(s) with an address dependency on the write request (block 620). After block 620, method 600 ends. If none of the younger requests have an address dependency with the write request being cancelled (conditional block 610, "no" leg), then the ordering master replays only the write request (block 625). After block 625, method 600 ends.

Figure 7:
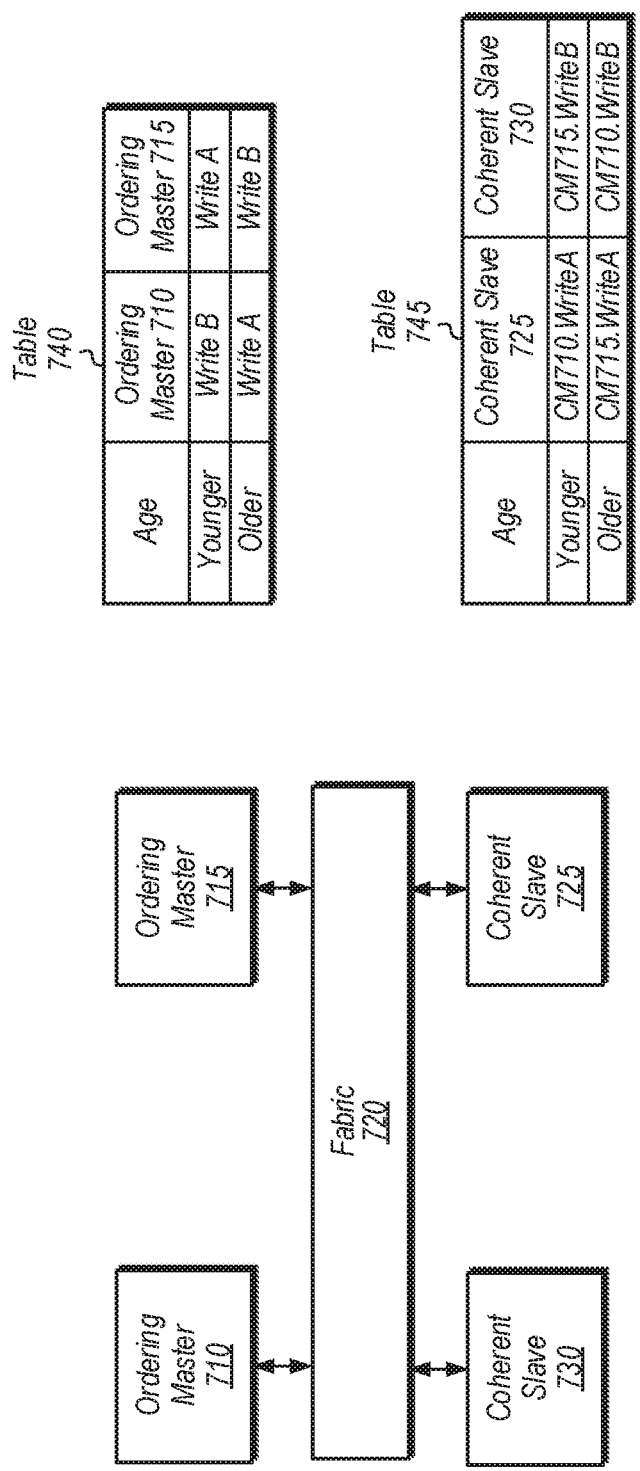
FIG. 7 is a block diagram of one embodiment of a deadlock scenario for a computing system.

Referring now to FIG. 7, a block diagram of one embodiment of a deadlock scenario for a computing system 700 is shown. In one embodiment, ordering masters are required to provide commit indications for their writes in age order and coherent slaves are required to execute address matching requests in age order. It is within the context of this embodiment that table 740 illustrates an example of ordering master 710 and ordering master 715 issuing back to back writes. As shown in table 740, ordering master 710 issues write A followed by write B, and ordering master 715 issues write B followed by write A. It is assumed for the purposes of this discussion that address A (targeted by the writes to A) belongs to coherent slave 725 and address B (targeted by the writes to B) belongs to coherent slave 730. It is also assumed for the purposes of this discussion that the writes to A and B cross in fabric 720. As used herein, for a pair of writes to "cross" means that the younger write of the pair arrives at the coherent slave earlier than the older write of the pair. For example, in one embodiment, the writes can cross in fabric 720 because ordering master 710 is closer to coherent slave 730 and ordering master 715 is closer to coherent slave 725.

If the write requests are received by coherent slave 725 and coherent slave 730 in accordance with the timing shown in table 745, this will result in a deadlock for system 700. As shown in table 725, coherent slave 725 receives the write to A by ordering master 715 followed by the write to A by ordering master 710. Also, coherent slave 730 receives the write to B by ordering master 710 followed by the write to B by ordering master 715. Accordingly, based on the timing of these requests, coherent slave 725 issues a target done message for the write to A by ordering master 715 but the write to A is the younger operation in ordering master 715. Ordering master 715 cannot give the commit indication until it receives a target done message for its write to B which is blocked due to an address dependency in coherent slave 730. Also, coherent slave 730 issues a target done message for the write to B by ordering master 710 but this write to B is the younger operation in ordering master 710. Ordering master 710 cannot give the commit indication until it receives a target done message for its write to A which is blocked due to an address dependency in coherent slave 725. Cancelling and replaying the younger transactions in both of ordering masters 710 and 715 releases the deadlock caused by this scenario.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
an ordering master unit;
a coherent slave unit;
a memory controller coupled to the coherent slave unit; and
an interconnect fabric coupled to the ordering master unit and the coherent slave unit;
wherein the system is configured to:
send a write request, without corresponding write data, to the coherent slave unit from the ordering master unit;
start a timer, by the ordering master unit, responsive to receiving an indication, from the coherent slave unit, that the write request is globally visible;
cancel the write request responsive to determining:
the timer has expired; and
at least one older write request is still not globally visible; and
replay the write request by resending the write request from the ordering master unit to the coherent slave unit responsive to cancelling the write request.

2. The system as recited in claim 1, wherein the ordering master unit is configured to cancel the write request by sending, to the coherent slave unit, a cancel indication that identifies the write request.

3. The system as recited in claim 1, wherein the ordering master unit is further configured to send an indication that the older write request can be committed, along with the write data of the write request, to the coherent slave unit responsive to all older write requests being globally visible prior to the timer expiring.

4. The system as recited in claim 1, wherein the ordering master unit is configured to provide commit indications for write requests in age order.

5. The system as recited in claim 4, wherein the coherent slave unit is further configured to execute address matching requests in age order.

6. The system as recited in claim 1, wherein the coherent slave unit is configured to write back any modified data to memory which was received via a probe response responsive to the write request being cancelled.

7. The system as recited in claim 1, wherein the ordering master unit is further configured to issue requests to the interconnect fabric without waiting for prior requests to become globally ordered.

8. A method comprising:
sending a write request, without corresponding write data, to a coherent slave unit from an ordering master unit;
starting a timer, by the ordering master unit, responsive to receiving an indication, from the coherent slave unit, that the write request is globally visible;
cancelling the write request responsive to determining:
the timer has expired; and
at least one older write request is still not globally visible; and
replaying the write request by resending the write request from the ordering master unit to the coherent slave unit responsive to cancelling the write request.

9. The method as recited in claim 8, further comprising cancelling the write request by sending, to the coherent slave unit, a cancel indication that identifies the write request.

10. The method as recited in claim 8, further comprising sending an indication that the older write request can be committed, along with the write data of the write request, to the coherent slave unit responsive to all older write requests being globally visible prior to the timer expiring.

11. The method as recited in claim 8, further comprising providing commit indications for write requests in age order.

12. The method as recited in claim 11, further comprising executing address matching requests in age order.

13. The method as recited in claim 8, further comprising writing back any modified data to memory which was received via a probe response responsive to the write request being cancelled.

14. The method as recited in claim 8, further comprising issuing requests to the interconnect fabric without waiting for prior requests to become globally ordered.

15. An apparatus comprising:
an ordering master unit; and
a coherent slave unit;
wherein the apparatus is configured to:
send a write request, without corresponding write data, to the coherent slave unit from the ordering master unit;
start a timer, by the ordering master unit, responsive to receiving an indication, from the coherent slave unit, that the write request is globally visible;
cancel the write request responsive to determining:
the timer has expired; and
at least one older write request is still not globally visible; and
replay the write request by resending the write request from the ordering master unit to the coherent slave unit responsive to cancelling the write request.

16. The apparatus as recited in claim 15, wherein the ordering master unit is configured to cancel the write request by sending, to the coherent slave unit, a cancel indication that identifies the write request.

17. The apparatus as recited in claim 15, wherein the ordering master unit is further configured to send an indication that the older write request can be committed, along with the write data of the write request, to the coherent slave unit responsive to all older write requests being globally visible prior to the timer expiring.

18. The apparatus as recited in claim 15, wherein the ordering master unit is configured to provide commit indications for write requests in age order.

19. The apparatus as recited in claim 18, wherein the coherent slave unit is configured to execute address matching requests in age order.

20. The apparatus as recited in claim 15, wherein the ordering master unit is further configured to issue requests to the interconnect fabric without waiting for prior requests to become globally ordered.

21. The system as recited in claim 1, wherein the write request is globally visible when all cached copies of data targeted by the write request have been invalidated.

22. The method as recited in claim 8, wherein the write request is globally visible when all cached copies of data targeted by the write request have been invalidated.

23. The apparatus as recited in claim 15, wherein the write request is globally visible when all cached copies of data targeted by the write request have been invalidated.

* * * * *